United States Patent [19]

Hamilton et al.

[11] Patent Number: 5,301,316
[45] Date of Patent: Apr. 5, 1994

[54] SYSTEM FOR DETERMINATION OF THE EQUIVALENCE OF TWO OBJECTS WITHOUT COMPROMISING THEN DONE BY A THIRD OBJECT NOMINATED BY ONE AND ACCETPED BY THE OTHER

[75] Inventors: Graham Hamilton; Michael L. Powell, both of Palo Alto; John Chapin, East Palo Alto, all of Calif.

[73] Assignee: Sun Microsystems, Inc., Mountain View, Calif.

[21] Appl. No.: 787,320

[22] Filed: Oct. 30, 1991

[51] Int. Cl.⁵ .............................. G06F 7/04; G06F 7/20
[52] U.S. Cl. ................................ 395/600; 395/425; 380/4; 364/DIG. 1; 364/246.6; 364/285.4; 364/286.4; 364/280; 364/285; 364/245.8; 364/252.1
[58] Field of Search ........................ 395/600, 425; 380/4

[56] References Cited

U.S. PATENT DOCUMENTS

| | | | |
|---|---|---|---|
| 5,138,712 | 8/1992 | Corbin | 395/700 |
| 5,142,674 | 8/1992 | Barker et al. | 395/600 |
| 5,202,982 | 4/1993 | Gramlich et al. | 395/600 |
| 5,204,961 | 4/1993 | Barlow | 395/725 |
| 5,220,657 | 6/1993 | Bly et al. | 395/425 |

OTHER PUBLICATIONS

Y. Yukote, "The Muse Object Architecture: A New Operating System Structuring Concept", Operating Systems Review, vol. 25, No. 2, pp. 27, 28 and 29, Apr. 1991.

Primary Examiner—Thomas C. Lee
Assistant Examiner—Wayne Amsbury
Attorney, Agent, or Firm—Blakely Sokoloff Taylor & Zafman

[57] ABSTRACT

In an object oriented distributed system based on the client-server model, the client domains, the server domains and the objects are implemented in an improved manner such that a client domain determines whether a first and a second object implemented by a first and a second server domain are equivalent by requesting the first object to nominate a third object to make the determination, the second object to concur to the nomination, and the nominated third object to make the determination, thereby allowing the determination to be made without comprising the first and second objects and the first and second server domains' security.

17 Claims, 6 Drawing Sheets

SYSTEM FOR DETERMINATION OF THE EQUIVALENCE OF TWO OBJECTS WITHOUT COMPROMISING THEN DONE BY A THIRD OBJECT NOMINATED BY ONE AND ACCETPED BY THE OTHER

BACKGROUND OF THE INVENTION

1. Field of the Invention

The present invention relates to the fields of distributed computer systems, client-server computing and object oriented programming. Specifically, the present invention is a method and apparatus for a client process to determine whether two objects are equivalent objects having particular application to implementing object oriented programming on distributed computer systems based on the client-server model.

2. Background

In an object oriented system, an object is a component comprising data and operations which can be invoked to manipulate the data. The operations are invoked on the object by sending calls to the object. Each object has an object type. The object type defines the object operations that can be performed on objects of that particular object type. The object operations are implemented independent of the objects themselves. Additionally, one object type may inherit the object operations defined and implemented for other object types. For further description on object-oriented design and programming techniques, see B. Meyer, *Object-oriented Software Construction*, (Prentice Hall, 1988).

In client-server computing, typically there is a set of computers that can communicate with one another through a network connecting the computers. Some of these computers act as providers of functionality to other computers. The providers of functionality are known as servers, the consumers of functionality are known as clients. However, the client-server model also generalizes to the case where distinct programs are running on the same computer. These distinct programs communicate with one another through a protected mechanism, and act as providers and consumers of functionality. For further description of client-server computing, see J. K. Ousterhout et al, *Medusa: An experiment in distributed operating system structure*, Communications of the ACM 23(2), 1980; R. M. Needham and A. J. Herbert, *The Cambridge Distributed Computing System*, (Addison-Wesley, 1982); and J. K. Ousterhout et al, *The Sprite distributed operating system*, IEEE Computer, 1988.

In an object oriented distributed systems based on the client-server model, typically there are servers that provide object oriented interfaces to their clients. That is, these servers support objects comprising data and associated operations. Clients may obtain access to these objects and may execute calls on them. These calls are transmitted from the client to the server. At the server, these calls are executed via the operations associated with the objects. The results of these calls are then transmitted back to the client. For further description of object oriented distributed systems, see E. D. Lazowska et al, *The Eden System: A Technical Review*, IEEE Transactions on Software Engineering SE-11(1), January 1985; Jul et al, *Fine grained mobility in the Emerald System*, ACM Transactions on Computer Systems, 6(1), 1988; and B. Liskov, *Distributed programming in Argus*, Communications of the ACM, 31(3), 1988.

Client programs are typically given object handles to reference particular objects. The object handle provides a way of locating the object and of executing calls upon it. In some systems, the object handles are designed such that a client can only obtain an object handle for a given object from the server or from an existing client. The server will only execute calls that are issued on valid object handles and the server may take care to only issue object handles to clients whom it has verified and are indeed permitted to access the underlying object. Typically, if one client has a secure handle then it can pass this handle on to other programs which it trusts. The other clients then share the same access to the underlying object that the first program had. For further descriptions of distributed systems based on secure handles, see A. D. Birrell and R. M. Needham, *A Universal File Server*, IEEE Transactions on Software Engineering, S-6(5), 1980, and S. J. Mullender et al, *Amoeba—A Distributed Operating System for the 1990s*, IEEE Computer, 23(5), 1990.

In an object oriented distributed systems based on the client-server model and secure handles, if a client is given two handles, it may wish to determine if these handles both reference the same underlying object. For example, it may wish to perform loop detection when it is navigating through a graph of related objects. The simple solution is for the client to compare the two handles. If the handles are identical, then the objects are equivalent. Unfortunately such a simplistic notion of equivalence is not really satisfactory. Typically, it is desirable to be able to use a variety of different handle formats in different situations. It may be that even though the two handles have different values, they do in fact reference the same object. In another situation, the two handles may reference distinct objects of a given server, but the server would prefer the distinct objects be treated as equivalent. In yet another situation, the two handles may reference distinct objects of distinct servers, but the distinct servers are cooperating servers and they would prefer the two objects to be treated as equivalent.

The notion of object equivalence is really a semantic notion whose truth can only be determined by the server(s) that implement the objects. It cannot be definitively answered by the client nor by the object invocation and transport mechanism. A server might support several different notions of equivalence, such as "loop detection equivalence", "exact equivalence", "locality equivalence", to be applied in different situations.

For example, consider a collection of objects that implement nameservers. These nameservers are collected into a directed graph. Different clients have different access rights to particular nameservers. So different clients are given handles on different objects that encapsulate different access to the same underlying state. Some of the nameservers might exist as replicated services running on a number of different hosts. So different clients might have handles that refer them to different servers of the replica set. But for loop detection purposes, it may be desirable to treat the different replicas or different access rights to a particular nameserver as representing the "same" object.

Thus, it is desirable to involve the implementing servers in determining whether two objects are equivalent based on their handles. The easiest mechanism would be to provide a server with both handles, including the handle of an object implemented by another server. Unfortunately, a fatal difficulty arises in decentralized and distributed systems. It may be that one of the two handles is in fact a handle that grants privileged access to a protected resource. That is, a handle may be acting as a capability such that mere possession of the handle grants power. In that case, the objects, and their server's security may be compromised by a malicious client.

As will be described, the present invention overcomes the disadvantages of the prior art, and provides a method and apparatus for a client process to securely determine whether two objects are equivalent, without compromising the objects and their server(s) security.

SUMMARY OF THE INVENTION

A method and apparatus for a client process to securely determine whether two objects are equivalent objects is disclosed, which has particular application to implementing object oriented programming on distributed computer systems based on the client-server model. The method and apparatus allows a client process to securely determine whether a first and a second object implemented by a first and a second server process respectively are equivalent objects, without compromising the first and second objects, and the first and second server processes' security.

Under the present invention, a network of computer systems comprising at least one CPU is provided for executing the client process, the first and second server processes, the first and second server processes having implemented and providing object oriented interfaces for manipulating the first and second objects. The client process determines whether the first and second objects are equivalent objects by first requesting the first object to nominate a third object to perform the determination. Upon receipt of the nomination, the client process requests the second object's concurrence to the nomination. If the second object concurs, the client process requests the third object to perform the determination, and returns a determination result indicating whether the two objects are equivalent objects, otherwise, the client process considers the two objects as non-equivalent objects.

Under the preferred embodiment, the first server process nominates the third object, in response to the client process' nomination request to the first object. Similarly, the second server process provides the concurrence or nonconcurrence to the nomination of the third object, in response to the client process' concurrence request to the second object. The first and second server processes may be the same server process or cooperating server processes.

Additionally, under the preferred embodiment, the second server process in concert with the first server process checks to confirm that the third object is implemented by the first server process before concurring. The first server process in concert with the second server process checks to confirm that the first and second objects are implemented by the first and second server processes respectively before the third object performs the determination, and returns a determination result. The first and second server processes communicate with each other in a secured manner.

Furthermore, under the preferred embodiment, the first, second and third objects are referenced by corresponding first, second and third object handles. The first server process nominates the third object by returning the third object handle to the client process. The client process requests concurrence by forwarding the returned third object handle to the second server process, and requests determination by forwarding the first and second object handles to the third object.

BRIEF DESCRIPTION OF THE DRAWINGS

The features and advantages of the present invention will be apparent from the following detailed description of the preferred embodiment of the invention with references to the drawings in which.

NOTATIONS AND NOMENCLATURE

The detailed description which follows is presented largely in terms of program procedures executed on a network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those that require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, objects, characters, terms, numbers, or the like. It should be borne in mind, however, that all these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operation described herein which form part of the present invention; the operations are machine operations. Useful machines for performing the operations of the present invention include general purpose digital computers or other similar devices. In all cases, it should be borne in mind the distinction between the method operations in operating a computer and the method of computation itself. The present invention relates to method steps for operating a computer in processing electrical or other physical signals to generate other desired physical signals.

The present invention also relates to apparatus for performing these operations. This apparatus may be specially constructed for the required purposes or it may comprise a general purpose computer as selectively activated or re-configured by a computer program stored in the computer. The procedures presented herein are not entirely related to any particular computer or other apparatus. In particular, various general purpose machines may be used with procedures written in accordance with the teaching herein, or it may prove more convenient to construct more specialized apparatus to perform the required method steps. The required structure for a variety of these machines will appear from the description given below.

DETAILED DESCRIPTION

A method and apparatus for a client process to securely determine whether two objects are equivalent objects is disclosed, which has particular application to implementing object oriented programming, on distributed computer systems based on the client-server model. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
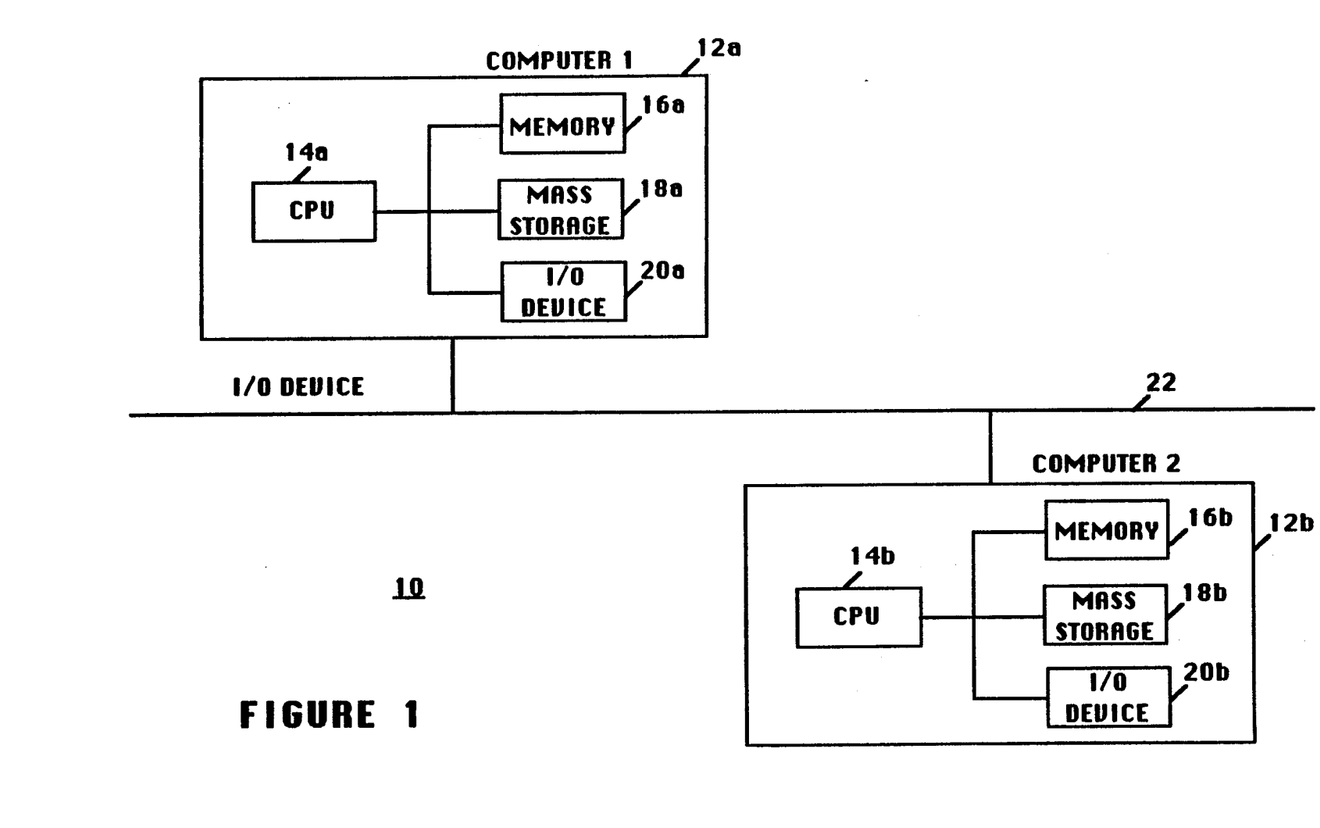
FIG. 1 shows a physical view of the hardware elements of a network of computer systems that incorporates the teachings of the present invention.

Referring now to FIG. 1, a block diagram illustrating a physical view of a network of computer systems that incorporates the teachings of the present invention organized by its hardware elements is shown. The network of computer systems 10 comprises at least one computer system 12a or 12b. If more than one computer system 12a and 12b are employed, the computer systems 12a and 12b are coupled to each other through a network 22. Each computer system 12a or 12b comprises a central processing unit (CPU) 14a or 14b, a memory unit 16a or 16b, a mass storage unit 18a or 18b and an input/output (I/O) device 20a or 20b. The characteristics of these hardware elements on each of the computer systems 12a or 12b, such as speed, size, may differ from each other. These hardware elements are those typically found in most general purpose computer systems and almost all special purpose computer systems. In fact, the several hardware elements contained within each of the computer system 12a and 12b are intended to be representative of this broad category of data processing systems. Particular examples of suitable data processing systems to fill the role of these computer systems 12a and 12b include computer systems manufactured by Sun Microsystems, Inc., Mountain View, Calif. Other computer systems having like capabilities may of course be adapted in a straight forward manner to perform the functions described below.

Figure 2:
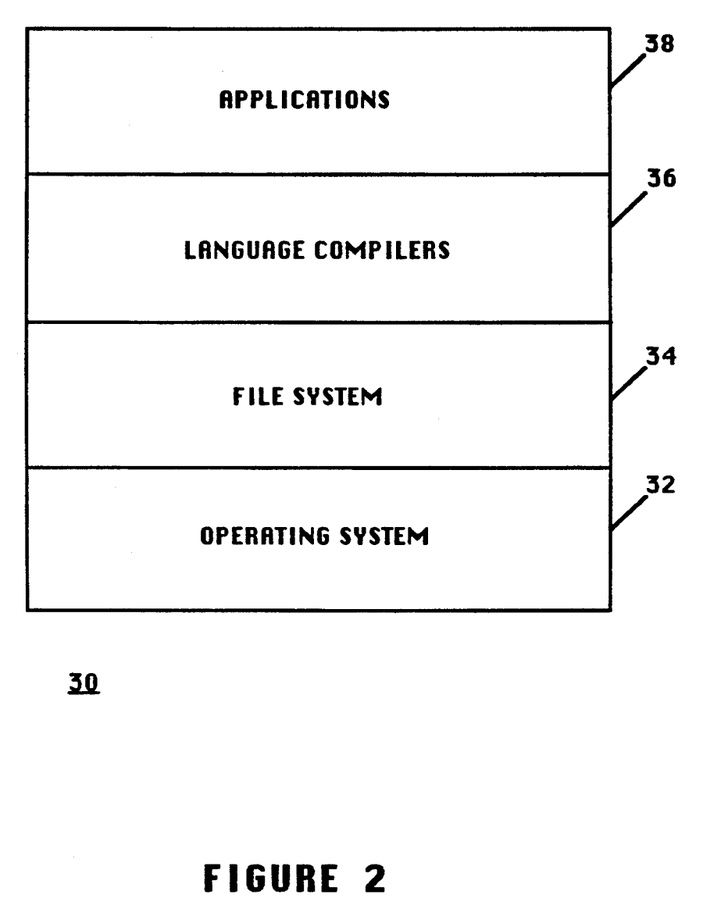
FIG. 2 shows a logical view of the software elements of one of the computer systems illustrated in FIG. 1.

Referring now to FIG. 2, a block diagram illustrating a logical view of one of the computer systems illustrated in FIG. 1 organized by its system software is shown. The system software 30 comprises an operating system 32, a file system 34, and at least one language compiler 36. The applications 38 executing on the computer system utilize the underlying system services offered by system software 32-36. The system software used on each of the computer system may be different provided they offer equivalent functions and capable of communicating with each other. These software elements are those typically found in most general purpose computer systems and almost all special purpose computer systems. In fact, the several software elements contained within each of the computer system are intended to be representative of this broad category of system software. Particular examples of suitable system software to fill the role of these system software 30 of the computer systems used by the present invention include the UNIX TM operating system, its file system and its Shell command language (UNIX TM is a registered trademark of Unix Laboratory). Other system software having like capabilities may of course be adapted in a straight forward manner to perform the functions described below.

Figure 3:
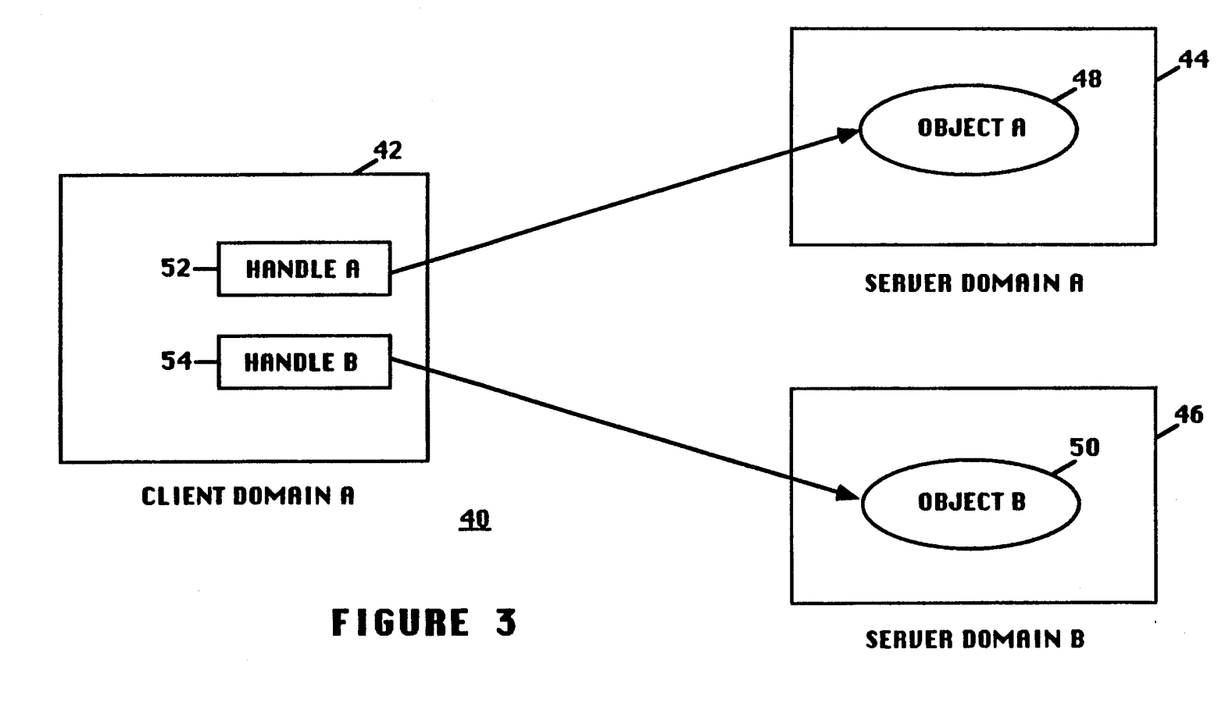
FIG. 3 shows another logical view of a client domain of the computer systems illustrated in FIG. 1 having to determine whether two objects are equivalent.

Referring now to FIG. 3, a block diagram illustrating a logical view of a client domain on the computer systems illustrated in FIG. 1 having to determine whether two objects are equivalent is shown. Shown in FIG. 3, is a client domain A 42 having two object handles A and B, 52 and 54. Object handles A and B, 52 and 54, refer to objects A and B, 48 and 50, implemented by server domains A and B, 44 and 46, to provide functionality for use by client domain A 42 and other client domains (not shown).

Client domain A 42, and server domains A and B, 44 and 46, are executing processes, i.e. active instances of computer programs. They are capable of communicating with one another in a secured manner. They are insulated and protected from wanton interference by one another as well as by other domains (not shown). They may reside on one of the computer systems, or they may reside on a number of different computer systems illustrated in FIG. 1. Furthermore, server domains A and B, 44 and 46, may cooperate with each other.

Objects A and B, 48 and 50, represent one or more applications and/or data manipulated by the applications. Objects A and B, 48 and 50, are referenced by object handles A and B, 52 and 54 respectively. The client domain A 42 accesses the objects A and B, 48 and 50, by providing the object handles A and B, 52 and 54, to server domains A and B, 44 and 46, respectively. The client domain a 42 obtains the object handles A and B, 48 and 50, from some privileged source. The object handles A and B, 48 and 50, are implemented in a manner such that they cannot be easily forged by the client domain 42, furthermore, their validity might be readily determined by the server domains, 44 and 46. Additionally, objects A and B, 48 and 50, are implemented in a manner such that they can identify server domains A and B, 44 and 46, as their implementing server domains respectively.

These objects and client/server domains are intended to be representative of a broad category of objects and client/server domains found in most object oriented distributed computer systems based on a client-server model and secure handles. In fact, both object handles A and B, 52 and 54, may refer to two different server objects within a single server domain, i.e. server domains A and B, 44 and 46, are the same server domain; or the "same" server object, i.e. objects A and B, 48 and 50, are the same object as well as server domains A and B, 44 and 46, being the same server domain. Furthermore, if server domains A and B, 44 and 46, are the same server domain, and server domains A/B's objects are equivalent to only other objects implemented by server domain A/B, objects A and B, 48 and 50, may be implemented without the capability of identifying their implementing server domains.

An example of a server domain might be a fileserver. An example of an object implemented by the exemplary fileserver might be a file. An example of an object handle referencing the exemplary file might be a secret file identification number that has been chosen from a sufficiently large range, such that its value cannot be easily guessed.

Figure 4A:
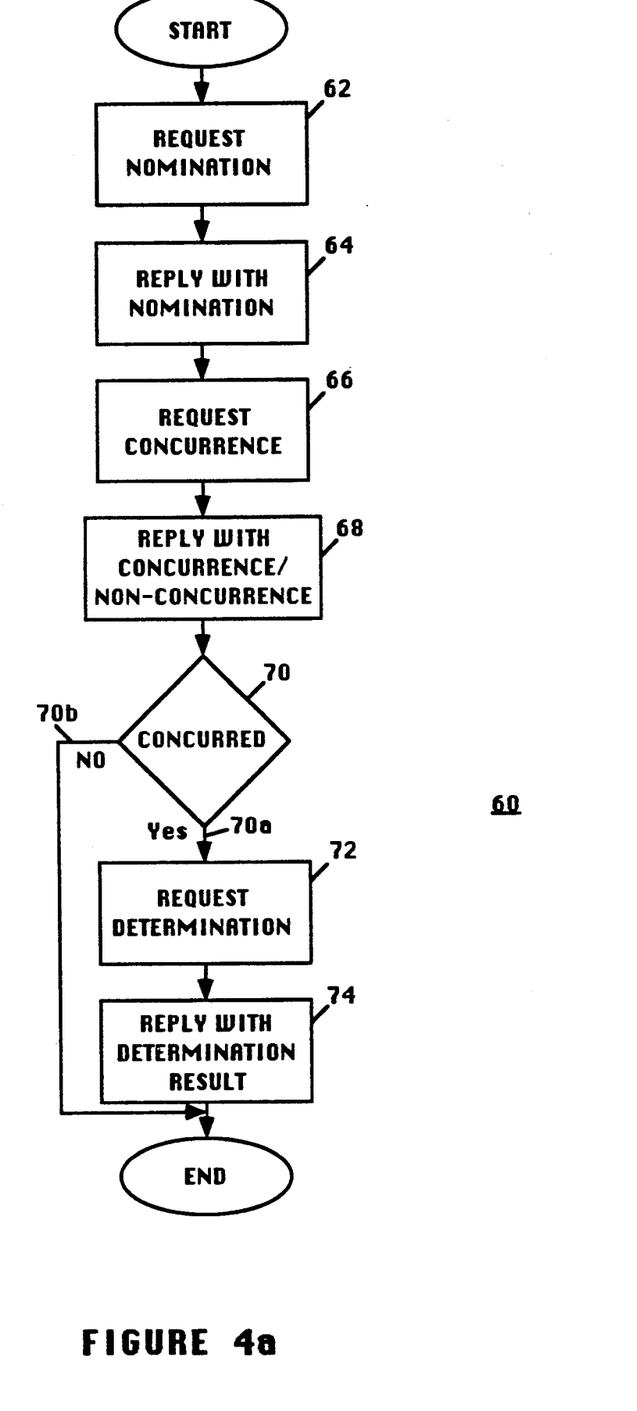
FIGS. 4a–4c are flow charts illustrating the method of the present invention for a client domain to determine whether two objects are equivalent.
Figure 4B:
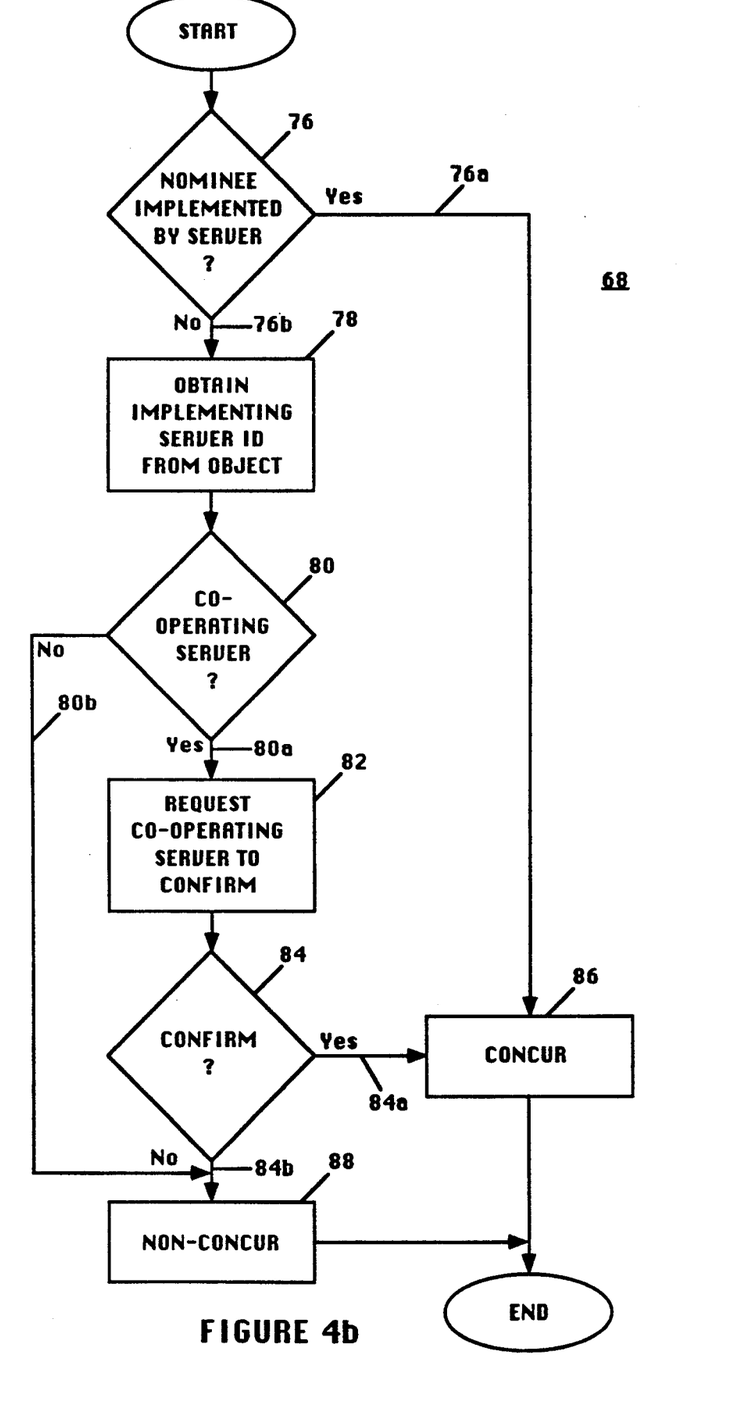
Figure 4C:
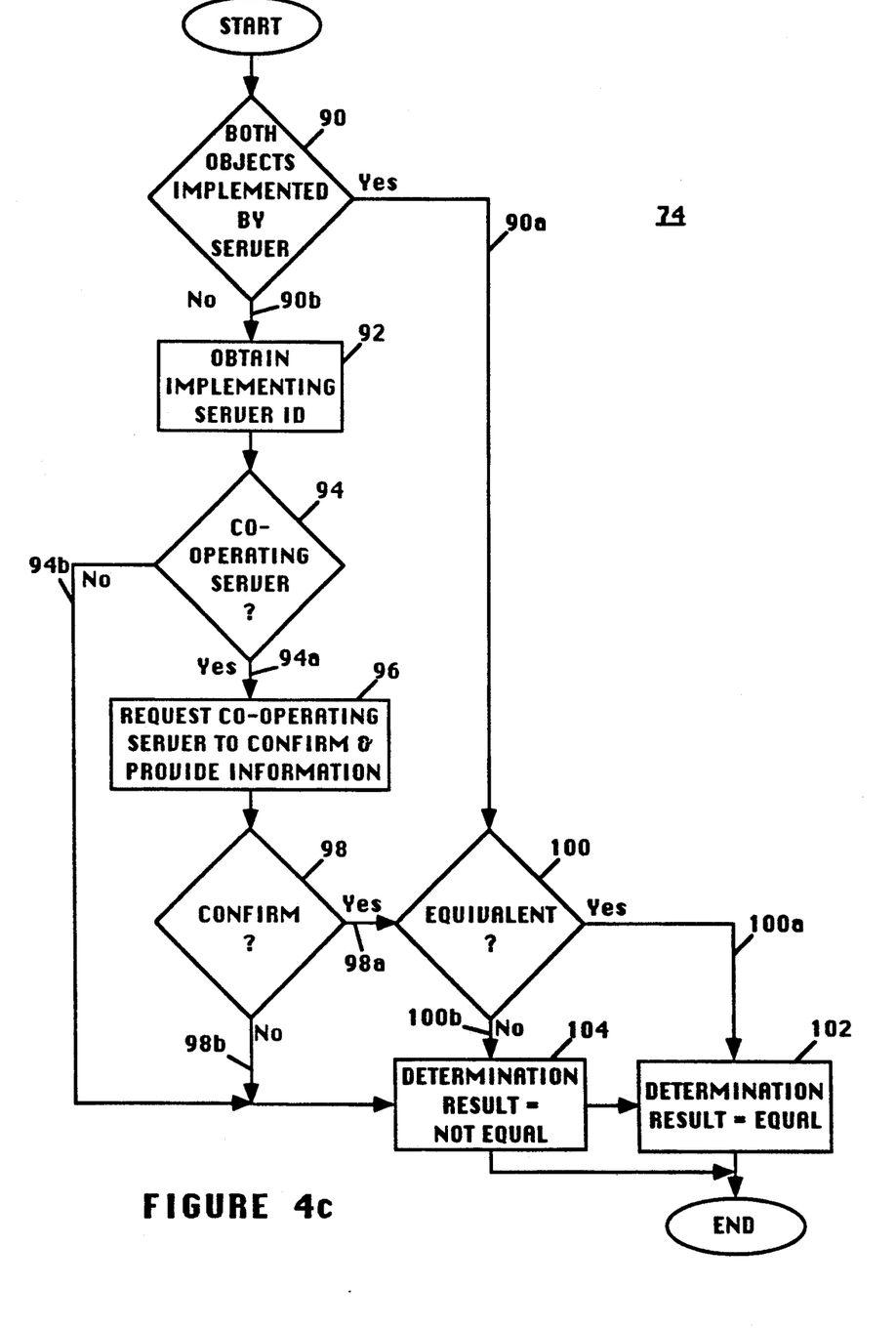

Referring now to FIGS. 4a-4c, three flow charts illustrating the method of the present invention for a client domain to determine whether a first and a second object are equivalent are shown. As shown in FIG. 4a, the client domain requests the first object to nominate a third object to determine whether the first and second objects are equivalent, block 62. A reply with the third object's nomination is provided to the client domain, block 64. In its presently preferred embodiment, the first server domain (server domain of the first object) replies with the third object's nomination by returning the third object's object handle. Furthermore, the third object is an object implemented by the first server domain. Additionally, if the first server domain cooperates with another server domain, the third object is also implemented in a manner such that it can identify the first server domain as its implementing server domain.

The client domain then requests the second object to concur with the third object's nomination, block 66. In the presently preferred embodiment, the client domain request the second object's concurrence by providing the second object with the third object's object handle. Similarly, a concurring or non-concurring reply is provided to the client domain's request, block 68. In the presently preferred embodiment, the second server domain (server domain of the second object) provides a "TRUE" value for concurring and a "FALSE" value for non-concurring. If the second object non-concurs with the third object's nomination, branch 70b, the client domain considers the two objects as non-equivalent.

On the other hand, if the second object concurs with the third object's nomination, the client domain then requests the third object to make the determination, block 72. In the presently preferred embodiment, the first object requests the third object to make the determination by forwarding the first and second objects' object handles to the third object. Upon making the determination, the third object returns the determination result to the first object, block 74.

FIG. 4b further illustrates the step of providing a concurring or non-concurring reply to the client domain (ref. 68 of FIG. 4a). In the presently preferred embodiment, the second server domain checks to determine if the third object is implemented by itself, block 76. If the third object is implemented by the second server domain itself, branch 76a, as described earlier, the second server domain returns a "TRUE" value to the client domain, concurring with the third object's nomination, block 86.

If the third object is not implemented by the second server domain, the second server domain obtains the third object's implementing server domain identity (i.e. the first server domain) from the third object, block 78. If the third object identifies an implementing server domain (i.e. the first server domain) that does not cooperate with the second server domain, branch 80b, as described earlier, the second server domain returns a "FALSE" value to the client domain non-concurring with the third object's nomination, block 88.

If the third object identifies an implementing server domain (i.e. the first server domain) that cooperates with the second server domain, branch 80a, the second server domain requests the implementing server domain (i.e. the first server domain) to confirm that the third object is indeed implemented by the identified server domain (i.e. the first server domain). Upon confirmation, branch 84a, as described earlier, the second server domain returns a "TRUE" value to the client domain, concurring with the third object's nomination, block 86; otherwise, branch 84b, as described earlier, the second server domain returns a "FALSE" value to the client domain non-concurring with the third object's nomination, block 88.

FIG. 4c further illustrates the step of determining whether two objects are equivalent and providing the determination result to the client domain (ref. 74 of FIG. 4a). In the presently preferred embodiment, the first server domain checks to determine if the second object as well as the first object are implemented by itself, block 90. If both objects are implemented by the first server domain itself, branch 90a, as described earlier, the first server domain determines if the first and second objects are equivalent, block 100, and returns the determination result accordingly, block 102 or 104.

If the second object is not implemented by the first server domain, branch 90b, the first server domain obtains the second object's implementing server domain identity (i.e. the second server domain) from the second object, block 92. If the second object identifies an implementing server domain (i.e. the second server domain) that does not cooperate with the first server domain, branch 94b, the second server domain returns a determination result of non-equivalent, block 104.

If the second object identifies an implementing server domain (i.e. the second server domain) that cooperates with the first server domain, branch 94a, the first server domain requests the implementing server domain (i.e. the second server domain) to confirm that the second object is indeed implemented by the identified server domain (i.e. the second server domain) and provides the necessary information to make the equivalency determination. Upon confirmation and receipt of the necessary information, branch 98a, as described earlier, the first server domain makes the equivalency determination, block 100, and returns the determination result to the client domain accordingly, block 102 or 104; otherwise, branch 98b, the first server domain returns a determination result of non-equivalent, block 104.

While the present invention has been described in terms of a presently preferred embodiment, those skilled in the art will recognize that the invention is not limited to the embodiment described. The method and apparatus of the present invention can be practiced with modification and alteration within the spirit and scope of the appended claims. The description is thus to be regarded as illustrative instead of limiting on the present invention.

What is claimed is:

1. In a network of computer systems comprising at least one central processing unit (CPU) executing a plurality of client and server processes wherein said processes and data manipulated by said processes are implemented as objects, a computer-implemented method for a client process to securely determine if a first and a second objects supported by a first and a second server processes respectively are equivalent objects with respect to one of the attributes such as contents, functionality, location and size, without compromising said first and second objects and said first and second server processes' security, said method comprising the steps of:

a) requesting said first object to nominate a third object to perform said determination for said client process by said client process;

b) replying to said client process with said nomination by said first object;

c) requesting said second object to concur to said nomination by said client process;

d) replying to said client process one of concurrence and nonconcurrence by said second object:

e) if said reply by said second object is a nonconcurrence, determining said first and second objects to be non-equivalent objects by said client process:

f) if said reply by said second object is a concurrence, requesting said third object to perform said determination for said client process by said client process: and g) if said reply by said second object is a concurrence, performing said determination for said client process, and returning a determination result to said client process by said third object, said determination result indicating whether said first and second objects are equivalent objects.

2. The method as set forth in claim 1, wherein, said first, second and third objects are referenced by a first, a second and a third object handle respectively;

said third object is nominated by returning said third object handle to said client process;

said second object's concurrence is requested by said client process by forwarding said returned third object handle to said second object; and said third object is requested to perform said determination for said client process by said client process by forwarding said first and second object handles to said third object.

3. The method as set forth in claim 1, wherein, said third object is nominated by said first server process, said first server process being notified of said request for nomination;

said one of concurrence and nonconcurrence is replied by said second server process, said second server process being notified of said request for concurrence.

4. The method as set forth in claim 3, wherein, said first and second server processes are the same server process;

said first, second and third objects are implemented by said same server process;

said same server process checks to confirm said first, second and third objects are implemented by said same server process, said third object being checked before said same server process concurs with said third object's nomination, said first and second objects being checked before said third object performs said determination for said client process, and returns said determination result to said client process.

5. The method as set forth in claim 4, wherein, said first, second and third objects are referenced by a first, a second and a third object handle respectively;

said third object is nominated by said same server process by returning said third object handle to said client process;

said second object's concurrence is requested by said client process by forwarding said returned third object handle to said second object;

said third object is checked by said same server process to confirm said third object is implemented by said same server process using said third object handle;

said third object is requested to perform said determination for said client process by said client process by forwarding said first and second object handles to said third object; and said first and second objects are checked by said same server process to confirm said first and second objects are implemented by said same server process using said first and second object handles.

6. The method as set forth in claim 3, wherein, said first and second server processes are cooperative server processes, each having implemented at least one object that is equivalent to an object implemented by the other server process;

said first and third objects are implemented by said first server process, and said second object is implemented by said second server process, said first, second, and third objects being capable of identifying one of said first and second server processes as their implementing server processes respectively;

said second server process in concert with said first server process checks to confirm said third object is implemented by said first server process, said third object being checked before said second server process concurs to said third object's nomination, said first server process being identified to said second server process as said third object's implementing server process by said third object; and said first server process in concert with said second server process checks to confirm said first and second objects are implemented by said first and second processes respectively, said first and second objects being checked before said third object performs said determination for said client process, and returns said determination result to said client process, said second server process being identified to said first server process as said second object's implementing server process by said second object.

7. The method as set forth in claim 6, wherein, said first, second and third objects are referenced by a first, a second and a third object handle respectively;

said third object is nominated by said first server process by returning said third object handle to said client process;

said second server process's concurrence is requested by said client process by forwarding said returned third object handle to said second server process;

said third object is checked by said second server process in concert with said first server process to confirm said third object is implemented by said first server process using said third object handle, said third object handle being forwarded to said first server process by said second server process;

said third object is requested to perform said determination for said client process by said client process by forwarding said first and second object handles to said third object;

said first and second objects are checked by said first server process in concert with said second server process to confirm said first and second objects are implemented by said first and second server processes using said first and second object handles respectively, said second object handle being forwarded to said second server process by said first server process; and said determination is made by said third object using said first and second object handles, and object information regarding said second object, said object information being provided to said third object by said second server process.

8. The method as set forth in claim 6, wherein, said first and second servers communicate with each other in a secured manner whereby security of said first, second and third objects and said first and second servers is maintained.

9. In a network of computer systems comprising at least one central processing unit (CPU) executing a plurality of client and server processes wherein said processes and data manipulated by said processes are implemented as objects, and apparatus for a client process to securely determine if a first and a second objects supported by a first and a second server processes respectively are equivalent objects with respect to one of the attributes such as contents, functionality, location and size, without compromising said first and second objects and said first and second server processes' security, comprising:
   a) client means comprising a client CPU for executing said client process, facilitating said client process in requesting said first object to nominate a third object to perform said determination for said client process, and subsequently requesting said second object to concur to said nomination;
   b) first server means coupled to said first client means comprising a first server CPU for executing said first server process, manipulating said first object, and facilitating replying to said client process with said nomination by said first object;
   c) second server means coupled to said first client means comprising a second server CPU for executing said second server process, manipulating said second object, and facilitating replying to said client process one of concurrence and nonconcurrence by said second object;
   wherein if said reply to said client process by said second object is a nonconcurrence, said client process considers said first and second objects as nonequivalent objects; and
   if said reply to said client process by said second object is a concurrence, said client means is also for facilitating said client process in requesting said third object to perform said determination for said client process, and said first server means is also for manipulating said third object and facilitating said third object in performing said determination for said client process, and returning a determination result to said client process, said determination result indicating whether said first and second objects are equivalent objects.

10. The apparatus as set forth in claim 9, wherein, said first, second and third objects are referenced by a first, a second and a third object handle respectively;
said client means facilitates subsequently requesting said second object to concur to said nomination by facilitating forwarding of said returned third object handle to said second object, and facilitating requesting said third object to perform said determination for said client process by facilitating forwarding of said first and second object handles to said third object; and
said first server means facilitates replying to said client process with said nomination by facilitating returning of said third object handle to said client process.

11. The apparatus as set forth in claim 9, wherein, said third object is nominated by said first server process, said first server process being notified of said request for nomination;
said one of concurrence and nonconcurrence is replied by said second server process, said second server process being notified of said request for concurrence.

12. The apparatus as set forth in claim 11, wherein,
said first and second server means are the same server means;
said first and second server processes are the same server process;
said first, second and third objects are implemented by said same server process;
said same server means is also for facilitating said same server process in checking to confirm said first, second and third objects are implemented by said same server process, said third object being checked before said same server process concurs with said third object's nomination, said first and second objects being checked before said third object performs said determination for said client process, and returns said determination result to said client process.

13. The apparatus as set forth in claim 12, wherein,
said first, second and third objects are referenced by a first, a second and a third object handle respectively;
said client means facilitates said client process in requesting said second object's concurrence by facilitating forwarding of said returned third object handle to said second object, and facilitates said client process in requesting said third object to perform said determination for said client process by facilitating forwarding of said first and second object handles to said third object; and
said same server means facilitates said same server process in replying to said client process with nomination by facilitating returning of said third object handle to said client process, facilitates said same server process in checking said third object to confirm said third object is implemented by said same server process using said third object handle, and facilitates said same server process in checking said first and second objects to confirm said first and second objects are implemented by said same server process using said first and second object handles.

14. The apparatus as set forth in claim 11, wherein,
said first and second server processes are cooperative server processes, each having implemented at least one object that is equivalent to an object implemented by the other server process;
said first and third objects are implemented by said first server process, and said second object is implemented by said second server process, said first, second, and third objects being capable of identifying one of said first and second server processes as their implementing server processes respectively;
said first and second server means are also coupled with each other;
said first server means is also for facilitating said first server process in concert with said second server process in checking to confirm said first and second objects are implemented by said first and second server processes respectively, said first and second objects being checked before said third object performs said determination for said client process, and returns said determination result to said client process, said second server process being identified to said first server process as said second object's implementing server process by said second object; and said second server means is also for facilitating said second server process in concert with said first server process in checking to confirm said third object is implemented by said first server process, said third object being checked before said second server process concurs to said third object's nomination, said first server process being identified to said second server process as said third object's implementing server process by said third object.

15. The apparatus as set forth in claim 14, wherein, said first, second and third objects are referenced by a first, a second and a third object handle respectively;

said client means facilitates said client process in requesting said second server process's concurrence by facilitating forwarding of said returned third object handle to said second server, facilitates said client process in requesting said third object to perform said determination for said client process by facilitating forwarding of said first and second object handles to said third object;

said first server means facilitates said first server process in replying to said client process with said third object's nomination by facilitating returning of said third object handle to said client process, facilitates said second server process in concert with said first server process in checking to confirm said third object is implemented by said first server process by facilitating using of said third object handle, facilitates said first server process in concert with said second server process in checking said first and second objects to confirm said first and second objects are implemented by said first and second server processes by facilitating using of said first object handle, and forwarding of said second object handle to said second server process respectively, and facilitates said third object in making said determination by facilitating using of said first and second object handles, and object information regarding said second object, said object information being provided to said third object by said second server process; and said second server means facilitates said second server process in concert with said first server process in checking to confirm said third object is implemented by said first server process by facilitating forwarding of said third object handle to said first server process, facilitates said first server process in concert with said second server process in checking to confirm said second object is implemented by said second server process by facilitating using of said second object handle, and facilitates said third object in making said determination by facilitating providing of said object information regarding said second object to said third object.

16. The apparatus as set forth in claim 14, wherein, said first and second server means facilitates said first and second servers to communicate with each other in a secured manner.

17. The apparatus as set forth in claim 9, wherein, at least two of said client CPU, said first server CPU, and said second server CPU, are the same CPU.

* * * * *

UNITED STATES PATENT AND TRADEMARK OFFICE
CERTIFICATE OF CORRECTION

PATENT NO. : 5,301,316

DATED : 4/5/94

INVENTOR(S) : Hamilton et al.

It is certified that error appears in the above-identified patent and that said Letters Patent is hereby corrected as shown below:

Title page, item [54] and col. 1, lines 1-5

IN THE TITLE PLEAE DELETE "SYSTEM FOR DETERMINATION OF THE EQUIVALENCE OF TWO OBJECTS WITHOUT COMPROMISING THEN DONE BY A THIRD OBJECT NOMINATED BY ONE AND ACCETPED BY THE OTHER' AND INSERT --SYSTEM FOR DETERMINATION OF THE EQUIVALENCE OF TWO OBJECTS WITHOUT COMPROMISING THEM DONE BY A THIRD OBJECT NOMINATED BY ONE AND ACCEPTED BY THE OTHER--

Title page, item [57] IN THE ABSTRACT, ON LINE 12, DELETE "COMPRISING" AND INSERT --COMPROMISING--

ON SHEET 6 OF 6, IN FIGURE 4C, PLEASE DELETE "THE ARROW BETWEEN 104 AND 102".

Column 5, LINE 66, PLEASE DELETE "UNIX$^{TM}$" AND INSERT IN LIEU THEREOF --UNIX®--

UNITED STATES PATENT AND TRADEMARK OFFICE
CERTIFICATE OF CORRECTION

PATENT NO. : 5,301,316
DATED     : April 5, 1994
INVENTOR(S) : Hamilton, et. al.

It is certified that error appears in the above-indentified patent and that said Letters Patent is hereby corrected as shown below:

Column 5, line 67, Delete "UNIX $^{TM}$" and insert in Liew thereof --UNIX $^{\circledR}$--.

Signed and Sealed this

Thirtieth Day of August, 1994

Attest:

BRUCE LEHMAN

Attesting Officer

Commissioner of Patents and Trademarks